Jan. 17, 1961  J. A. MARANO  2,968,212
PHOTOCHROMATIC ASTIGMATIC SLIDE
Filed Aug. 12, 1957
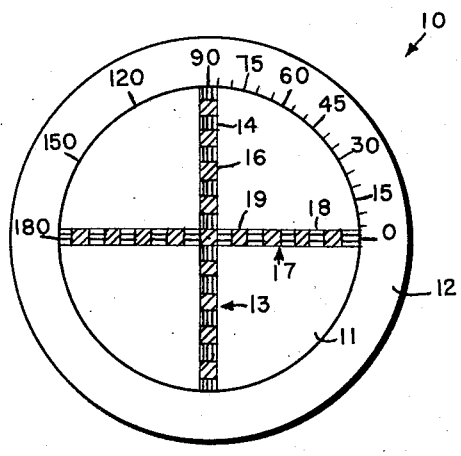
JOSEPH A. MARANO
*INVENTOR.*
BY
*Robert O. Richardson*
ATTORNEY

United States Patent Office 2,968,212
Patented Jan. 17, 1961

2,968,212

PHOTOCHROMATIC ASTIGMATIC SLIDE

Joseph A. Marano, San Diego, Calif.
(664 Manchester Terrace, Inglewood, Calif.)

Filed Aug. 12, 1957, Ser. No. 677,666

2 Claims. (Cl. 88—20)

This invention relates to photochromatic astigmatic slides and has particular reference to improved means and methods for more accurately testing the vision of patients having astigmatism, to determine the axis and amount of astigmatism and thus the axis of the cylindric lens required for correction.

One form of astigmatic testing slide is shown in the patent to Cohen, No. 2,065,430 of December 22, 1936. Here a transparent slide is rotatably mounted against a red background. On the slide are two cross lines formed of aligned spaced black dashes 17 and 18. This arrangement provides test means which may be projected onto a screen and rotated to selectively locate the cross lines at different meridians throughout 180 degrees. If the patient has less than one diopter of astigmia, two lines at right angles to each other will be seen, but one line is blacker than the other. When the patient has more than one diopter of astigmia, the patient may see only one black line. In either case plus sphere is added until the blacker line can just be seen "fairly clear" or slightly fogged. If the patient sees two lines, one blacker than the other, the cross lines are rotated until the lines are apparently blurred to the same extent and the meridian is noted on the scale. The cross lines are then rotated in the opposite direction until the lines are apparently equally blurred to the same extent and the meridian is again noted on the scale. The principal meridians of astigmatism of the eye being tested will be half way between the noted meridians. The slide is again rotated so that the lines coincide with the principal meridians so that the maximum difference in blackness of the two lines will exist. Minus cylinders are then added with axes at right angles to the indicated angle of blacker line until both lines appear equally black. In those cases where the astigmatic error is greater than one diopter the patient reports only one black line. The slide is rotated until the visible line appears to have the greatest blackness. When this position has been found, minus cylinders are again added with their axes at right angles to the blackest line to determine the amount of astigmatism.

The obvious disadvantage of this type of slide is the difficulty and inaccuracy of the patient in distinguishing between shades of blackness in cases where he sees two lines. This disadvantage has been overcome in the slide comprising the present invention by the provision of a color mixing technique in which a dashed line of two colors changes to a solid line of a third color at the axis of astigmatism. The choice of colors used is such that the two individual colors lose their identity in forming a new color when the axis of astigmatism is reached.

It is therefore an object of this invention to provide for a new and improved means and method for more accurately testing for the axis and amount of astigmatism in a patient's eyes.

Another object is the provision of a photochromatic astigmatic slide having colored indicia thereon which changes color at the axis of astigmatism.

Another object is the provision of a photochromatic astigmatic slide having colors thereon which lose their identity in forming a new color when the slide is rotated to the axis of astigmatism.

Another object is the provision of a photochromatic astigmatic slide having a plurality of test indicia of different colors for testing for astigmatism in persons having normal colored vision and persons having a color deficiency to certain colors.

Another object is the provision of a color mixing method of testing for astigmatism.

Another object is the provision of a method of testing for astigmatism wherein the patient reports seeing a different color at the axis of astigmatism when colored indicia is rotated and the return of the original colors when the correct correction has been made.

Other objects will become apparent as further description of the invention proceeds, wherein there is shown in the drawing a perspective view of a slide showing the preferred indicia means thereon.

It has been discovered that in using the slide having the black dashed line on a red background, the lighter shades of blackness seen by the patient is in reality the dashed black line with small amounts of red in between the dashes. At the axis of astigmatism however, the black dashes appear to have been elongated into a solid black line and hence the patient reports a darker black line. The eye can detect a new color much quicker than it can distinguish between shades of the same color. To take advantage of this characteristic of the eye in detecting color changes and in the apparent elongation of objects along the axis of astigmatism, a slide 10 has been made with a rotatable disc 11 and a stationary scale 12. The physical moveable components of the slide may be similar to existing rotary slides and may be adapted to the projection instruments now in use by refractionists. A vertical line 13 on disc 11 is composed of two intermittent colors 14, 16. A horizontal line 17 is also composed of two intermittent colors 18, 19. These colors are on any desired background color for suitable slide projection, such as opaque, white, as shown in the drawing, or it may be a transparency as it well known in the art of slide projection. Colors 14, 16 are preferably red (656.2 mu) and yellowish-green (492.1 mu) for use by persons having normal colored vision while colors 18, 19 are preferably green and blue to be used by persons having a color deficiency to red. The mixture of the red and yellowish-green will appear yellow to the person of normal color vision while the mixture of green and blue will appear white to the protanope but is unchanged to a person with normal color vision. Other colors are used for patients with deuteranopia. Other colors however must also be of such a nature that the two individual colors lose their identity in forming a new color when the axis of astigmatism is reached.

The test is conducted for one eye at a time. A slight myopia, or nearsightedness, is induced by spherical lenses, thus bringing the astigmatic foci in front of the retina. The observer is then asked to report what he sees. He should report two lines, one of red and green dots or dashes and the other of blue and green dots or dashes if he has normal color vision. The disc 11 is then rotated until the red and green line appears as a yellow line, and the green and blue line remains unchanged. The yellow line is then in alignment with the axis of astigmatism which is then read off on calibrated scale 12. Minus cylindrical lenses are now added at this axis at .25 diopter intervals until the red and green dashed line reappears to replace the solid yellow line. The amount of cylindrical power added before the former colors reappeared indicates the amount of astigmatism. The refraction is then continued with spherical lenses.

In the case of the protanope, the blue and green line appears white when on the astigmatic axis. The above procedure is followed in the same manner as for the person with normal color vision.

From the foregoing it will be seen that simple, efficient and economical means and methods have been provided for all the objects and advantages of the invention. It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

Having thus described the invention, what is claimed is:

1. An apparatus for use in determining the axis of astigmatism of a viewer comprising a body member having a front face of a uniform color constituting a background and having a straight solid line superimposed thereon and composed of alternate sections of uniform size and of two different colors, the colored sections constituting said line being complementary to one another, and means mounting said body for rotation about a center point thereof whereby the colors of which said line is composed will appear as a single solid color different from the color of either of the sections of the line when said line is in alignment with the axis of astigmatism of the viewer, said body having a second solid line superimposed on the background thereof at an angle to the first mentioned line, said second line being composed of sections of uniform sizes and of alternate colors different from one another and at least one of which is different from the colors of the sections of the first mentioned line, and which colored sections of the second line are capable of appearing to a viewer having a color distinguishing deficiency as a solid colored line of a color different from either of the colors of the sections of said lines when said second line is in alignment with the axis of astigmatism of the viewer.

2. An apparatus for use in determining the axis of astigmatism of a viewer comprising a body member having a front face of a uniform color constituting a background and having a straight solid line superimposed thereon and composed of alternate sections of uniform size and of two different colors, the colored sections constituting said line being complementary to one another, and means mounting said body for rotation about a center point thereof whereby the colors of which said line is composed will appear as a single solid color different from the color of either of the sections of the line when said line is in alignment with the axis of astigmatism of the viewer, said body member having a second solid line superimposed on the background thereof at an angle to the first mentioned line, said second line being composed of sections of uniform sizes and of alternate colors different from one another and from the color of the background and at least one of which is different from the colors of the sections of the first mentioned line, and which colored sections of the second line are capable of appearing to a viewer having a color distinguishing deficiency as a solid colored line of a color different from either of the colors of the sections of said lines when said second line is in alignment with the axis of astigmation of the viewer.

References Cited in the file of this patent

UNITED STATES PATENTS

| | | |
|---|---|---|
| 1,556,525 | King | Oct. 6, 1925 |
| 1,564,495 | Sheard | Dec. 8, 1925 |
| 2,065,430 | Cohen | Dec. 22, 1936 |
| 2,196,906 | Sherman | Apr. 9, 1940 |
| 2,453,335 | Morris | Nov. 9, 1948 |

FOREIGN PATENTS

| | | |
|---|---|---|
| 441,758 | Great Britain | Jan. 24, 1936 |